United States Patent Office 2,997,403
Patented Aug. 22, 1961

2,997,403
REFLEX REFLECTIVE COATING COMPOSITION
Charles E. Searight, Jackson, Miss., assignor to Cataphote Corporation, Toledo, Ohio, a corporation of Ohio
No Drawing. Filed Feb. 7, 1957, Ser. No. 638,798
1 Claim. (Cl. 106—193)

This invention relates to an apparatus for the application of a coating to a surface which it is desired to make reflective.

It is known in the art that the application of a single layer of small glass beads can be utilized to render a surface reflective, and extensive use of this knowledge has been made in the instance of highway and advertising signs, motion picture projection screens, in various reflex reflective sheet materials, and in various other similar cases. The coating of beads has been applied by dropping the beads on a painted or other surface while the surface is in a tacky or softened condition. The surface, if the bead coating is to be uniform, must be horizontal or the small spherical particles will roll and either become lost or pick up a coating of the paint or other tacky material and become substantially opaque.

It has also been proposed, in the case of highway markings, to mix small glass beads into a marking paint and spray the mixture onto a roadway. Here the beads are intermixed with the paint pigment and the line or surface is not reflective when initially made but becomes so after traffic has worn the paint coating away to a sufficient extent to expose the surface of a top layer of beads. While it has been proposed to use this paint-bead mixture for signs and warning markers not subject to traffic, as for example, bridge abutments, the low reflectivity of the coating makes the incorporation of the supposedly reflective beads uneconomical since little or no reflection is obtained until the top surface of paint has worn away or disintegrated.

The present invention provides a simple means for overcoming the disadvantages of the known processes for rendering surfaces reflective and comprises the incorporation of small glass beads in suspension in a translucent or transparent coating material contained in a pressurized spraying vessel from which the bead-carrying coating is released as a fine spray or mist.

In carrying out the invention, any suitable pressure vessel may be used, such as a can having a spray head forming a closure therefor.

The glass beads are selected so that the maximum size of any bead is less than 0.004 inch and from 70 percent to 90 percent are in the size range of from 0.0017 to 0.0024 inch. It is usually preferred that the beads outside the size range of from 0.0017 to 0.0024 inch be smaller than 0.0067 inch. Such beads, particularly when of comparatively low specific gravity glass, are readily suspendible in a liquid vehicle without serious settling. Whatever settling occurs prior to use may be overcome simply by shaking the can to re-mix the contents.

It will be apparent that glass of any refractive index can be used in the apparatus of the invention and applied as above described. However, it has been found that reflex reflection is comparatively poor when beads made of glass having an index of refraction less than about 1.85 are used. It is preferred, therefore, to use beads which have a comparatively high refractive index, usually at least about 1.9. Most glasses which have a high refractive index contain high percentages of lead oxide, and are rapidly deteriorated when exposed to the weather. It has been found that a glass which has a high refractive index and which weathers well is produced from approximately the indicated percentages by weight of the following ingredients: lead monosilicate 32.5 percent, titanium dioxide 24.2 percent, silicon dioxide 10.4 percent, sodium nitrate 18.8 percent, barium carbonate 12.6 percent, and zinc oxide 1.3 percent. In addition to weathering well and having a high refractive index (1.91 to 1.93), such glass also has a comparatively low density, about 4.25 grams per cubic centimeter. The low density is also important from the standpoint of settling of the beads. In a preferred embodiment, therefore, the invention contemplates the use of glass beads having a refractive index of at least 1.9, and a density not greater than about 4.25 grams per cubic centimeter. Most desirably, the glass also weathers well, has a refractive index from about 1.9 to 1.95, and has a density from about 2.0 to 4.25 grams per cubic centimeter.

The liquid vehicle preferably comprises a clear, quick drying lacquer, for example of the nitro cellulose, ethyl cellulose, cellulose acetate, cellulose acetate butyrate, or the like type, in a suitable solvent, and, if desired, a resinous material, a plasticizer, or other usual lacquer additive. The solvent portion of the lacquer may conveniently be composed of an appropriate blend of alcohols, ethers, esters, ketones and hydrocarbons. If desired, appropriate organic pigmentary dyestuffs can also be used. A suspending agent, such as a mixture of phosphatides, a metallic stearate, an alkyl phosphate, a modified montmorillionite, or a mixture of these named materials, is also preferably used to prevent or minimize settling of the beads.

The bead-lacquer mixture is maintained under pressure in a vessel by an inert gas such as a mixture of chlorofluoromethanes. Such gas will not cause drying of the lacquer within the vessel nor will it permit the formation of a skin over the surface which usually evidences oxidation.

Preferred formulations comprise from about 60 volumes to about 75 volumes of a lacquer, of spraying viscosity, with from 40 to 25 volumes of the beads. Cellulose acetate butyrate is a preferred lacquer. An appropriate volume of such formulation can be placed in the vessel, and then charged in any suitable manner to an initial pressure of about 35 pounds per square inch gauge, for example, by the introduction of the inert gas from a suitable supply under a pressure of about 95 pounds per square inch gauge.

In use, it is only necessary for the operator to shake the can to complete the dispersion of glass beads throughout the vehicle, press the button to open the outlet valve and direct the spray at the surface to be coated. By reason of the fact that the lacquer and beads are dispersed as fine particles, drying time is greatly lessened over brushing or drop-on methods. The present invention makes it possible for a sign painter, for example, to paint a sign and subsequently to apply a reflective coating thereto even after the sign has been placed in a vertical position. By reason of the control available over the spray, only selected portions can be made reflective if desired.

It will be appreciated that a composition, as identified above, comprising a lacquer with glass beads dispersed therein, where the beads have a refractive index from about 1.90 to about 1.95 and a density not greater than about 4.25 grams per cubic centimeter, is particularly advantageous, and can be used in various ways other than that previously discussed. For example, the composition can be sprayed in other ways, or brushed, or even roller-coated, onto a surface which it is desired to make reflex reflective. Such composition is particularly suited for application by spraying because of the relatively low specific gravity of the glass beads, which simplifies the problem of maintaining them in a uniform dispersion.

What I claim is:
A sprayable composition for the production of a permanent, reflex reflective coating which consists essen- tially of a clear, cellulose derivative lacquer, a solvent suitable for said lacquer, and a plurality of small glass beads uniformly dispersed in said lacquer, said beads having a refractive index from about 1.90 to about 1.95, and a density not greater than about 4.25 grams per cubic centimeter, 70 percent to 90 percent of said beads having diameters between about 0.0017 and about 0.0024 inch and all of said beads having diameters less about 0.0067 inch, and said beads being present in the dispersion to the extent of from about 25 volumes to about 40 volumes with from about 75 volumes to about 60 volumes of the lacquer.

References Cited in the file of this patent

UNITED STATES PATENTS

| | | |
|---|---|---|
| 2,326,634 | Gebhard et al. | Aug. 10, 1943 |
| 2,574,971 | Heltzer | Nov. 13, 1951 |
| 2,580,132 | Seymour | Dec. 25, 1951 |
| 2,646,364 | Porth | July 21, 1953 |
| 2,948,191 | Hodgson et al. | Aug. 9, 1960 |